(12) United States Patent
Peng

(10) Patent No.: US 10,919,009 B2
(45) Date of Patent: Feb. 16, 2021

(54) AUTOMATIC STIRRING CUP

(71) Applicant: Shenzhen ToolFeel Plastic & Hardware Co., Ltd., Guangdong (CN)

(72) Inventor: Guo Peng, Guangdong (CN)

(73) Assignee: Shenzhen ToolFeel Plastic & Hardware Co., Ltd., Shenzhen (CN)

( * ) Notice: Subject to any disclaimer, the term of this patent is extended or adjusted under 35 U.S.C. 154(b) by 302 days.

(21) Appl. No.: 16/178,605

(22) Filed: Nov. 2, 2018

(65) Prior Publication Data

US 2020/0070110 A1 Mar. 5, 2020

(30) Foreign Application Priority Data

Sep. 3, 2018 (CN) .......................... 2018 1 1023531

(51) Int. Cl.
*B01F 7/16* (2006.01)
*B01F 13/00* (2006.01)
*B01F 15/00* (2006.01)

(52) U.S. Cl.
CPC ............ *B01F 7/162* (2013.01); *B01F 13/002* (2013.01); *B01F 15/00538* (2013.01)

(58) Field of Classification Search
CPC ...................................... B01F 7/162

USPC ......................................... 366/199, 273, 274
See application file for complete search history.

(56) References Cited

U.S. PATENT DOCUMENTS

| 2,459,224 A * | 1/1949 | Hendricks | ........... A47J 43/0465 |
| | | | 366/274 |
| 2,982,132 A * | 5/1961 | Mendlowitz | ........... G01K 17/04 |
| | | | 600/504 |
| 2,990,256 A * | 6/1961 | Lovins | ..................... C30B 7/00 |
| | | | 117/202 |

\* cited by examiner

*Primary Examiner* — David L Sorkin

(57) ABSTRACT

An automatic stirring cup, comprising a cup body, a stirring ball arranged at the bottom of a cavity of the cup body and a power base for supplying power to the stirring ball; a first electrode for electrically connecting the stirring ball and the power base is arranged at the bottom of the cup body; a first magnet is arranged in the stirring ball, and a second magnet matched with the first magnet is arranged at the bottom of the cup body, and the stirring ball and the cup body are magnetically connected; a third magnet matched with the second magnet is arranged at the power base, and the cup body and the power base are magnetically connected. The automatic stirring cup could avoid the water leakage problem during the use of the automatic stirring cup in the prior art.

8 Claims, 2 Drawing Sheets

AUTOMATIC STIRRING CUP

CROSS REFERENCE TO RELATED APPLICATION

The present application claims the priority of Chinese patent application No. 201811023531.7 filed on Sep. 3, 2018. The contents of the above application are all hereby incorporated by reference.

FIELD OF THE INVENTION

The present application relates to a stirring cup, and more particularly, to an automatic stirring cup.

BACKGROUND OF THE INVENTION

The driving motor of an existing automatic stirring cup is arranged outside the cup body, and the stirring rod connected to the driving motor passes through the cup body by a central shaft. Since the stirring rod is a movable component, during the use of the stirring rod, it will easily cause the water leakage in a place in the bottom of the stirring cup body connecting the stirring rod, and the stirring rod extends from the bottom of the cup body into the cup body of the stirring cup, so the stirring rod cannot be separately disassembled for cleaning.

Therefore, it is necessary to improve the existing automatic stirring cup to solve the water leakage problem of the automatic stirring cup.

SUMMARY OF THE INVENTION

The present application provides an automatic stirring cup, which could solve the water leakage problem of the automatic stirring cup.

In order to solve the above technical problem, the technical solution adopted by the present application is: an automatic stirring cup, comprising a cup body, a stirring ball arranged at the bottom of a cavity of the cup body, and a power base for supplying power to the stirring ball;

a first electrode for electrically connecting the stirring ball and the power base is arranged at the bottom of the cup body;

a first magnet is arranged in the stirring ball, and a second magnet matched with the first magnet is arranged at the bottom of the cup body, and the stirring ball and the cup body are magnetically connected;

a third magnet matched with the second magnet is arranged at the power base, and the cup body and the power base are magnetically connected.

Further, the stirring ball comprises a stirring ball shell, a stirring rod and a driving motor;

the stirring rod extends outward from the inside of the stirring ball shell, and the driving motor is arranged inside the stirring ball shell, and the driving motor is used for driving the stirring rod to rotate.

Further, a second electrode is arranged at the stirring ball shell, and one end of the second electrode is electrically connected to the driving motor, and the other end of the second electrode is matched with the first electrode at the bottom of the cavity of the cup body.

Further, the power base comprises a base shell, a third electrode and a battery arranged inside the base shell; one end of the third electrode is connected to the battery, and the other end is matched with the first electrode at the bottom of the cup body.

Further, the second magnet at the cup body is arranged at a central position of the bottom of the cup body; the first magnet is arranged at a central position of a bottom surface of the stirring ball, and the third magnet is arranged at a central position of an upper surface of the power base.

Further, a stirring fan blade is arranged at the stirring rod.

Further, the automatic stirring cup further comprises a cup lid, and the cup lid covers a cup rim of the cup body.

Further, a convex and small cup opening is formed by extending on the cup lid, and the cup lid is further provided with a small buckle lid matched with the small cup opening.

In the technical solution of the present application, the stirring ball is adsorbed to the bottom of the cavity of the cup body by the magnet, and the bottom of the cup body is provided with the first electrode for electrically connecting the stirring ball and the power base, thereby avoiding the water leakage problem during the use of the automatic stirring cup in the prior art, caused by that the stirring rod needs to extend from the outside of the cup body to the inner cavity of the cup body. At the same time, the stirring ball and the cup body are connected by magnets, so the stirring ball could be conveniently disassembled from the cup body to facilitate the cleaning of the stirring ball.

BRIEF DESCRIPTION OF THE DRAWINGS

The specific structure of the present application is described in detail below with reference to the accompanying drawings.

Wherein, 100—cup body, 101—second magnet, 102—first electrode; 200—stirring ball, 201—first magnet, 202—second electrode, 203—driving motor, 204—stirring rod; 300—power base, 301—third magnet, 302—third electrode; 400—cup lid, 401—small cup opening, 402—small buckle lid.

DESCRIPTION OF THE EMBODIMENTS

In order to describe the technical content, the structural features, and the objects and effects of the present application in detail, the following will describe in detail with reference to the embodiments and the accompanying drawings.

Figure 1:
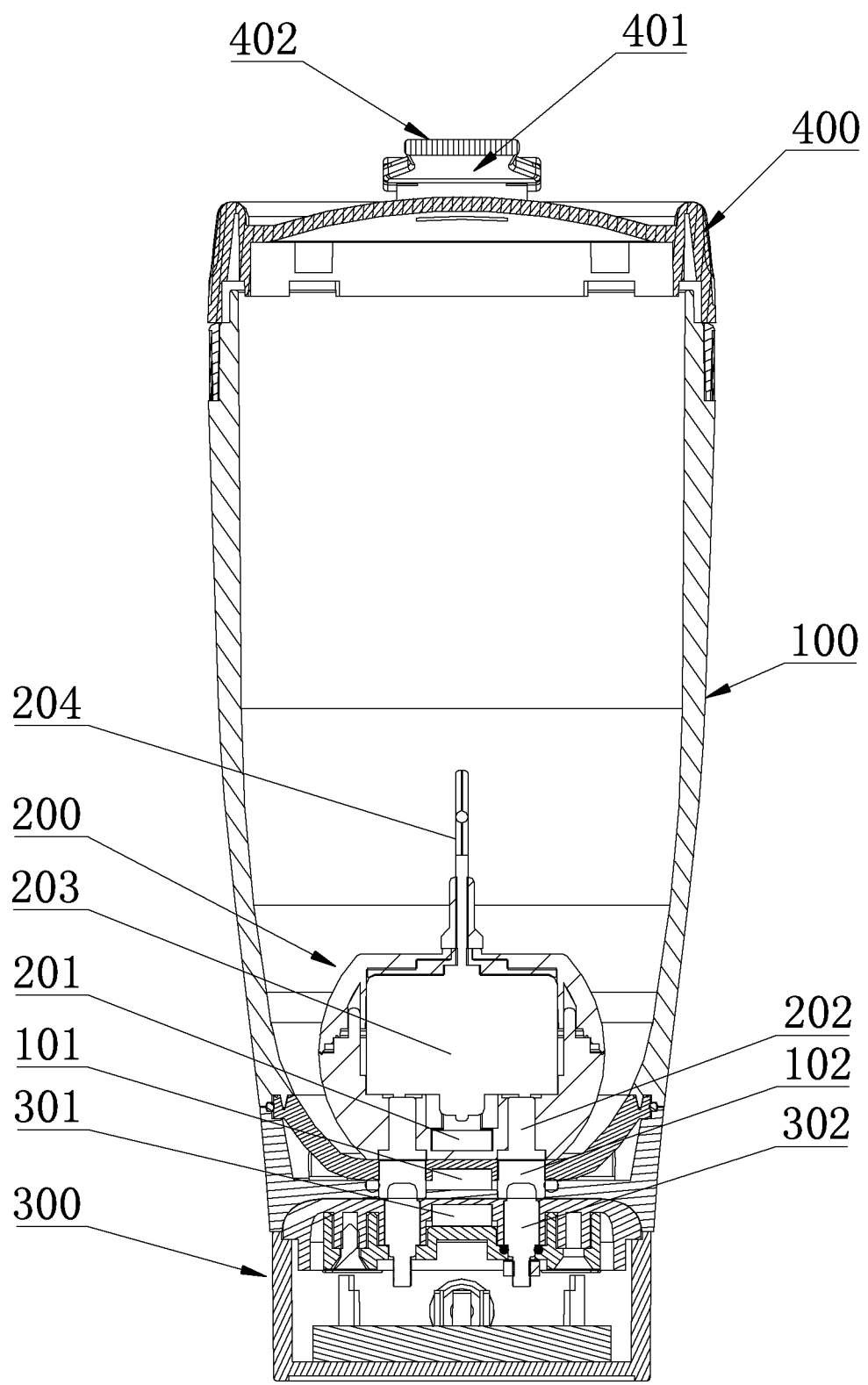
FIG. 1 is a structural diagram of the inside of the automatic stirring cup according to an embodiment of the present application.
Figure 2:
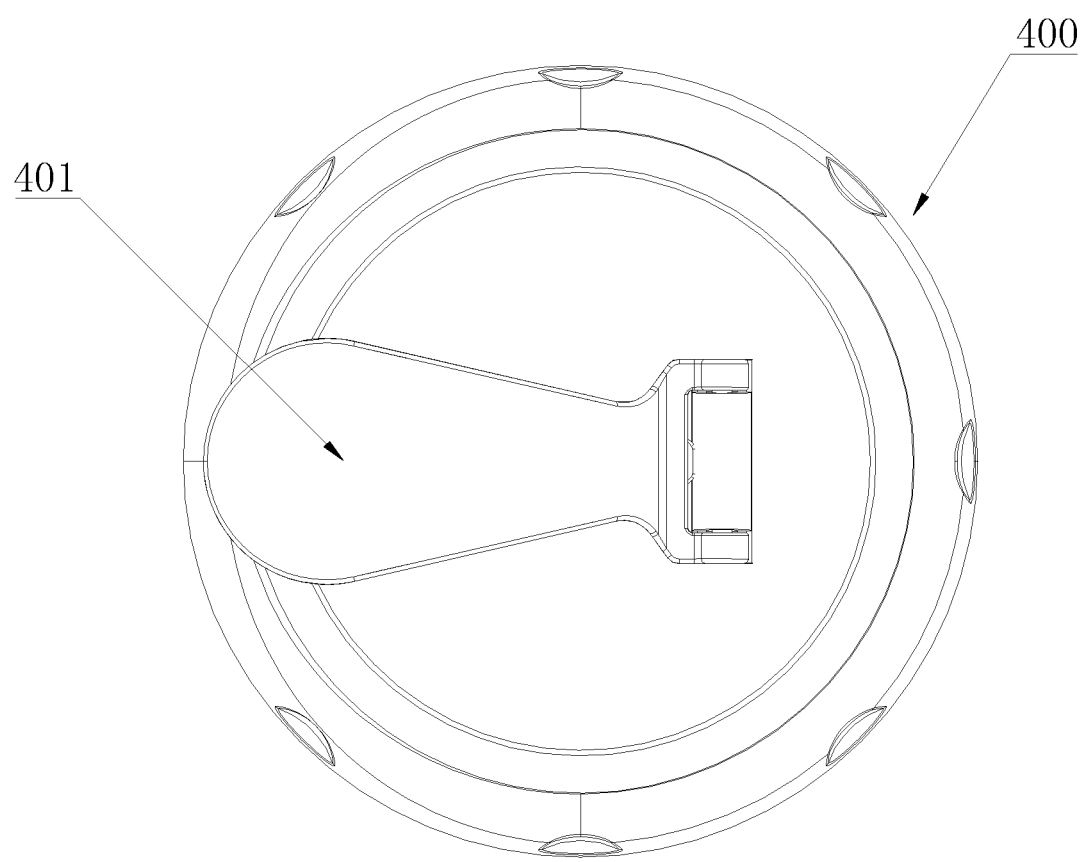
FIG. 2 is a diagram of the cup lid according to an embodiment of the present application.

Please refer to FIG. 1 and FIG. 2 for the following technical solutions.

An automatic stirring cup, comprising a cup body 100, a stirring ball 200 arranged at the bottom of the inner cavity of the cup body 100, and a power base 300 for supplying power to the stirring ball;

a first electrode 102 for electrically connecting the stirring ball 200 and the power base 300 is arranged at the bottom of the cup body 100;

a first magnet 201 is arranged in the stirring ball 200, and a second magnet 101 matched with the first magnet 201 is arranged at the bottom of the cup body 100, and the stirring ball 200 and the cup body 100 are magnetically connected;

a third magnet 301 matched with the second magnet 101 is arranged at the power base 300, and the cup body 100 and the power base 300 are magnetically connected.

In the present technical solution, the stirring ball 200 is adsorbed to the bottom of the cavity of the cup body 100 by the magnet, and the bottom of the cup body 100 is provided with the first electrode 102 for electrically connecting the stirring ball 200 and the power base 300, thereby avoiding the water leakage problem during the use of the automatic stirring cup in the prior art, caused by that the stirring rod needs to extend from the outside of the cup body to the inner cavity of the cup body. At the same time, the stirring ball 200 and the cup body 100 are connected by magnets, so the stirring ball 200 could be conveniently disassembled from the cup body 100 to facilitate the cleaning of the stirring ball 200.

Embodiment 1

In an embodiment, the stirring ball 200 comprises a stirring ball shell, a stirring rod 204, and a driving motor 203;

The stirring rod 204 extends outward from the inside of the stirring ball shell, and the driving motor 203 is arranged inside the stirring ball shell, and the driving motor 203 is used for driving the stirring rod 204 to rotate.

In the present embodiment, the driving motor 203 is sealed inside the stirring ball shell, and is supplied power through a second electrode 202 on the shell, so the driving motor 203 could drive the stirring rod 204 to rotate, to stir the mixture placed into the cup body of the stirring cup.

Embodiment 2

In an embodiment, a second electrode 202 is arranged at the stirring ball shell, and one end of the second electrode 202 is electrically connected to the driving motor 203, and the other end of the second electrode 202 is matched with the first electrode 102 at the bottom of the cavity of the cup body 100.

In the present embodiment, when the stirring ball 200 is adsorbed to the cup body 100 of the stirring cup by the magnets, the second electrode 202 on the stirring ball shell contacts the first electrode 102 at the bottom of the cavity of the cup body 100, and by the first electrode 102 of the cup body 100, the stirring ball 200 could be electrically connected with the power base 300 outside the cup body 100.

Embodiment 3

The power base 300 comprises a base shell, a third electrode 302 and a battery arranged inside the base shell; one end of the third electrode 302 is connected to the battery, and the other end of the third electrode is matched with the first electrode 102 at the bottom of the cup body.

In the present embodiment, the battery is a rechargeable battery, used for supplying power to the driving motor 203 in the stirring ball 200. When the cup body 100 is absorbed to the power base 300 by the magnets, the third electrode 302 at the power base 300 contacts the first electrode 102 at the cup body 100, so the battery supplies power to the driving motor 203 inside the stirring ball 200.

Embodiment 4

In an embodiment, the second magnet 101 at the cup body 100 is arranged at a central position of the bottom of the cup body 100; the first magnet 201 is arranged at a central position of the bottom surface of the stirring ball 200, and the third magnet 301 is arranged at a central position of the upper surface of the power base 300.

In the present embodiment, the magnets are arranged at the central positions, making the adsorption effect more stable.

Embodiment 5

In an embodiment, a stirring fan blade is arranged at the stirring rod.

In the present embodiment, the stirring fan blade is arranged on the stirring bod 204, which could improve the stirring efficient, and at the same time, the stirring fan blade could be disassembled and replaced, so a corresponding stirring fan blade could be replaced for different objects to be stirred.

Embodiment 6

In an embodiment, a power switch button is arranged on a side of the power base 300.

In the present embodiment, the power switch is arranged on the side, facilitating the control to the stirring process for the user.

Embodiment 7

In an embodiment, the automatic stirring cup further comprises a cup lid 400, and the cup lid 400 covers the cup rim of the cup body 100.

In the present embodiment, the cup lid 400 could seal the cup body 100, to prevent the liquid in the stirring cup from overflowing during the stirring process.

Embodiment 8

In an embodiment, a convex and small cup opening 401 is formed by extending on the cup lid 400, and the cup lid 400 is further provided with a small buckle lid 402 matched with the small cup opening 401.

In the present embodiment, the small cup opening 401 is arranged at the cup lid 400, facilitating the user to pour the stirring solution in the stirring cup out from the small cup opening 401 through the small cup opening 401, and at the same time, a small buckle lid 402 matched with the small cup opening 401 is provided.

In conclusion, in the technical solution of the present application, the stirring ball 200 is adsorbed to the bottom of the inner cavity of the cup body 100 by magnets, and the bottom of the cup body 100 is provided with the first electrode 102 for electrically connecting the stirring ball 200 and the power base 300, thereby avoiding the water leakage problem during the use of the automatic stirring cup in the prior art, caused by that the stirring rod needs to extend from the outside of the cup body to the inner cavity of the cup body, and at the same time, the stirring ball 200 and the cup body 100 are connected by the magnets, so the stirring ball 200 could be conveniently disassembled from the cup body 100 to facilitate the cleaning of the stirring ball 200.

The terms "first", "second", " . . . " used herein only represent the distinction of their names, and do not mean the difference in the importance degree and position.

Here, the "up", "down", "left", "right", "front", and "back" only represent their relative positions and do not indicate their absolute positions.

The above description is only the embodiments of the present application, and is not intended to limit the scope of the present application, and the equivalent structure or equivalent process transformation made according to the description and the drawings of the present application, or the direct or indirectly application to other related technology fields, all fall into the protection scope of the present application.

What is claimed is:

1. An automatic stirring cup, comprising a cup body, a stirring ball arranged at the bottom of a cavity of the cup body and a power base for supplying power to the stirring ball;
   a first electrode for electrically connecting the stirring ball and the power base is arranged at the bottom of the cup body;
   a first magnet is arranged in the stirring ball, and a second magnet matched with the first magnet is arranged at the bottom of the cup body, and the stirring ball and the cup body are magnetically connected;
   a third magnet matched with the second magnet is arranged at the power base, and the cup body and the power base are magnetically connected.

2. The automatic stirring cup according to claim 1, wherein the stirring ball comprises of a stirring ball shell, a stirring rod and a driving motor;
   the stirring rod extends outward from the inside of the stirring ball shell, and the driving motor is arranged inside the stirring ball shell, and the driving motor is used for driving the stirring rod to rotate.

3. The automatic stirring cup according to claim 2, wherein a second electrode is arranged at the stirring ball shell, and one end of the second electrode is electrically connected to the driving motor, and the other end of the second electrode is matched with the first electrode at the bottom of the cavity of the cup body.

4. The automatic stirring cup according to claim 3, wherein the power base comprises a base shell, a third electrode and a battery arranged inside the base shell; one end of the third electrode is connected to the battery, and the other end is matched with the first electrode at the bottom of the cup body.

5. The automatic stirring cup according to claim 4, wherein the second magnet at the cup body is arranged at a central position of the bottom of the cup body; the first magnet is arranged at a central position of a bottom surface of the stirring ball, and the third magnet is arranged at a central position of an upper surface of the power base.

6. The automatic stirring cup according to claim 5, wherein a stirring fan blade is arranged at the stirring rod.

7. The automatic stirring cup according to claim 1, wherein the automatic stirring cup further comprises a cup lid, and the cup lid covers a cup rim of the cup body.

8. The automatic stirring cup according to claim 7, wherein a convex and small cup opening is formed by extending on the cup lid, and the cup lid is further provided with a small buckle lid matched with the small cup opening.

* * * * *